Patented Aug. 19, 1941

2,252,721

UNITED STATES PATENT OFFICE 2,252,721

CYCLIC AMIDINE

Karl Miescher, Riehen, Ernst Urech, Basel, and Willi Klarer, Riehen, Switzerland, assignors, by mesne assignments, to Ciba Pharmaceutical Products, Incorporated, Summit, N. J., a corporation of New Jersey No Drawing. Application April 29, 1939, Serial No. 270,932. In Switzerland May 11, 1938

8 Claims. (Cl. 260—309)

This invention relates to the manufacture of new cyclic amidines by causing an amino acid having an aromatic or heterocyclic radical as a substituent at the nitrogen atom or a derivative thereof to react with an aliphatic diamine.

The compounds thus obtained may be supposed to comprise the structure

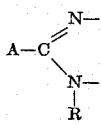

in which A is an amino alkyl radical containing an aromatic or heterocyclic radical as a substituent at the nitrogen atom and R is hydrogen or a hydrocarbon radical. Both amidine nitrogen atoms are united together by an alkylene chain as for instance in imidazoline or tetrahydropyrimidine rings.

As parent materials there may be used besides the acids themselves derivatives thereof, for instance the imidoethers obtainable from the nitriles, the amidines containing open chains, the imido halides corresponding with the amides or the thioamides. These compounds may be caused by the process to react with aliphatic diamines such as 1:2- or 1:3-diamines to form cyclic amidines. A hydrogen atom of one of the two amino-groups of the diamines may also be monosubstituted by a hydrocarbon radical.

Various cyclic amidines have hitherto been made. However the manufacture of cyclic amino acid amidines according to the present process has not hitherto been described. This is due to the fact that the manufacture of the imido ethers generally used as parent materials is beset by difficulties. Thus the statements of Paradies, Berichte, vol. 36, page 4303 (1903) that phenylaminoacetimidoether can be made by the process he describes have not been confirmed. This author indeed refers to the difficulties which present themselves in the production of this compound. It has now been found that the imidoethers used as parent materials for this invention can be made surprisingly easily by a condensation of the alcohol with the nitrile in the presence of for instance hydrochloric acid in a chloroform solution. Moreover it must be considered as surprising that the amino-group of the parent material does not participate in the reaction with formation of molecular chains or rings, since this possibility is certainly present.

The aromatic or heterocyclic substituted cyclic amino acid amidines obtainable by this invention have interesting pharmacological properties. Surprisingly they have a strong effect on the blood pressure and blood vessels.

The new compounds find application in therapeutics.

Cross reference is made to companion application Ser. No. 270,933, filed on even date herewith, which relates to the manufacture of new amidines by causing a reactive ester of an oxyalkyl amidine to react with an amine.

The following examples illustrate the present invention, the parts being by weight:

Example 1

25 parts of phenylaminoacetimidoethyl-ether dihydrochloride of melting point 186–188° C. (with decomposition), obtainable for example by the action of hydrogen chloride on a mixture of equivalent quantities of phenylaminoacetonitrile and ethyl alcohol in chloroform solution, are mixed while cooling with an alcoholic solution of 9.3 parts of ethylenediamine and the mixture is heated to boiling until the evolution of ammonia is at an end. When the reaction is complete the ethylenediamine hydrochloride which has separated is removed by filtration and the filtrate is concentrated. There is thus obtained 2-(phenylaminomethyl)-imidazoline hydrochloride in the form of crystals melting at 180–182° C. and freely soluble in water.

The same compound is obtained by heating 21 parts of phenylaminoacetamidine hydrochloride (of melting point 135–137° C. produced from the above mentioned imido ethers by the reaction with ammonia) with 6.3 parts of ethylenediamine in alcoholic solution.

Instead of the phenylaminoacetimidoethylether there may be used any other ether as parent materials or one may start from a compound containing a substituent in the phenyl nucleus, for instance alkyl-, alkoxy-, oxy-, aryloxy-, amino-, nitro- or carboxyl-groups.

In like manner there may be obtained the 2-(α-phenylamino-n-heptyl)-imidazoline or the 2-(ε-phenylamino-n-pentyl)-imidazoline as well as compounds alkylated at the nitrogen atom of the amino acid radical.

Instead of ethylenediamine there may be used for example 1:2- or 1:3-propylenediamine. In the latter case there is obtained a phenylaminomethyl-tetrahydropyrimidine.

Example 2

8.3 parts of phenylaminothioacetamide and 3.2 parts of ethylenediamine are heated together in an oil bath at 130-160° C. When hydrogen sulfide has been eliminated the mass is introduced into caustic soda solution. In this manner 2-(phenylaminomethyl)-imidazoline is precipitated in the form of an oil which soon solidifies. By converting this into the monohydrochloride there is obtained the compound of a melting point of 180-182° C. as described in Example 1.

Phenylaminoacetic acid may also be used as parent material and may be heated with ethylenediamine in the presence of a mineral acid preferably in molecular proportions and if desired in presence of a condensing agent.

In similar manner the following compounds may be obtained:

2-(2'-methoxy-phenylaminomethyl)-imidazoline hydrochloride M. P. 198-200° C.
2-(1'-naphthylaminomethyl)-imidazoline hydrochloride M. P. 218-222° C.
2-(γ-phenylaminopropyl)-imidazoline hydrochloride M. P. 163-164° C.
2-(2':4'-dimethyl-phenylaminomethyl)-imidazoline hydrochloride M. P. 224-226° C. with decomposition.
2-(para-phenyloxy-phenylaminomethyl)-imidazoline hydrochloride M. P. 170-172° C.
2-(6-methoxy-quinolyl-8-aminomethyl)-imidazoline hydrochloride M. P. 193-195° C.
2-(6-methoxy-quinolyl-8-aminopropyl)-imidazoline dihydrochloride M. P. 230-232° C. with decomposition.

The parent materials such as 6-methoxy-quinolyl-8-amino-acetonitrile (melting point 100-102° C.) and 6-methoxy-quinolyl-8-amino-γ-butyronitrile (hydrochloride melting point 178-180° C.) are not described in literature. They may be made for example by the reaction of 6-methoxy-8-aminoquinoline with chloroacetonitrile and γ-chlorobutyronitrile respectively. The equally unknown para-phenyloxy-phenylaminoacetonitrile may be obtained from para-phenyloxy-aniline, formaldehyde-bisulfite and potassium cyanide in aqueous solution.

What we claim is:
1. The compounds of the formula

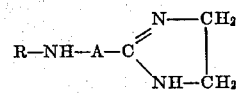

wherein A stands for a short-chain, saturated and unsubstituted alkyl group, and R for an aromatic radical.

2. The compounds of the formula

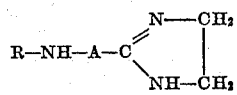

wherein A stands for a short-chain, saturated and unsubstituted alkyl group, and R for a heterocyclic radical.

3. The compounds of the formula

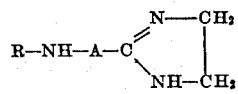

wherein A stands for a short-chain, saturated and unsubstituted alkyl group, and R for a member of the group consisting of phenyl and alkoxyphenyl.

4. The compound of the formula

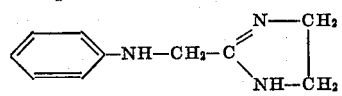

forming a hydrochloride of melting point 180-182° C.

5. The compounds of the formula

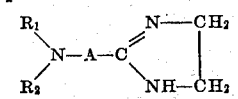

wherein A stands for a short-chain saturated and unsubstituted alkyl group, $R_1$ for a member of the group consisting of an aromatic radical and a heterocyclic radical, and $R_2$ for a member of the group consisting of hydrogen and alkyl.

6. The compounds of the formula

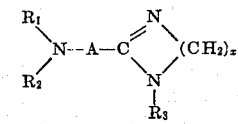

wherein A stands for a short-chain saturated and unsubstituted alkyl group, $R_1$ for a member of the group consisting of an aromatic radical and a heterocyclic radical, $R_2$ for a member of the group consisting of hydrogen and alkyl, $R_3$ for a member of the group consisting of hydrogen and a hydrocarbon radical, and $x$ for an integer selected from the group consisting of 2 and 3.

7. The compound of the formula

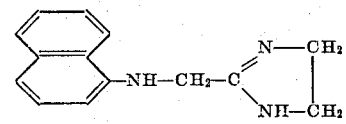

forming a hydrochloride of M. P. 218-222° C.

8. The 2-(2'-methoxy-phenylaminomethyl)-imidazoline, forming a hydrochloride of M. P. 198-200° C.

KARL MIESCHER.
ERNST URECH.
WILLI KLARER.